(12) United States Patent
Gardos

(10) Patent No.: US 6,814,110 B2
(45) Date of Patent: Nov. 9, 2004

(54) METHOD OF AND APPARATUS FOR IMPROVED PRESSURIZED FLUID DISPENSING FOR THE GUARANTEED FILLING OF CAVITIES AND/OR THE GENERATING OF GUARANTEED UNIFORM GASKET BEADS AND THE LIKE

(75) Inventor: Ivan Gardos, Shrewsbury, MA (US)

(73) Assignee: Stainless Steel Coatings, Inc., So. Lancaster, MA (US)

( * ) Notice: Subject to any disclaimer, the term of this patent is extended or adjusted under 35 U.S.C. 154(b) by 141 days.

(21) Appl. No.: 10/320,694

(22) Filed: Dec. 12, 2002

(65) Prior Publication Data

US 2004/0112914 A1 Jun. 17, 2004

(51) Int. Cl.[7] .................................................. B65B 1/04
(52) U.S. Cl. ........................ 141/198; 141/95; 222/55; 222/399
(58) Field of Search ........................... 222/55, 63, 333, 222/380, 394, 399; 141/5, 198, 95, 192, 387, 388, 399

(56) References Cited

U.S. PATENT DOCUMENTS

| 4,493,286 A | * | 1/1985 | Carson ....................... 118/677 |
| 4,789,100 A | * | 12/1988 | Senf ............................ 239/61 |
| 6,050,450 A | * | 4/2000 | Gardos ......................... 222/1 |
| 6,675,988 B2 | * | 1/2004 | Cline et al. .................. 222/55 |

* cited by examiner

Primary Examiner—Steven O. Douglas
(74) Attorney, Agent, or Firm—Rines and Rines

(57) ABSTRACT

A novel technique and apparatus for dispensing viscous fluids such as epoxies, urethanes, plastic adhesives, silicones and the like and particularly two-component fluid materials, that enables the injection of such fluid materials into grooves and closed cavities and the like to a defined pressure that insures complete filling, and that, additionally, provides the capability to create constant flow rate through fluid delivery through flexible hoses, particularly where the dispensing head is some distance from the fluid pumps.

41 Claims, 5 Drawing Sheets

Variable Ratio Meter Mix System

METHOD OF AND APPARATUS FOR IMPROVED PRESSURIZED FLUID DISPENSING FOR THE GUARANTEED FILLING OF CAVITIES AND/OR THE GENERATING OF GUARANTEED UNIFORM GASKET BEADS AND THE LIKE

FIELD

The present invention relates generally to fluid dispensing; but more specifically, though not exclusively, to the dispensing of multiple-part components such as highly viscous epoxies, urethanes, silicones, plastic adhesives and other similar fluid materials to be used, for example, as gasket sealing beads, or for the injection-filling of grooves or closed cavities and the like, particularly where visual inspection of the degree of cavity filling is not possible and a guarantee of complete cavity filling is desired.

BACKGROUND

The successful dispensing of such fluid materials has heretofore been achieved with, for example, disposable, pre-loaded dual fluid/component cartridges adapted to be attached and removed from dispensing apparatus that, under hydraulic or pneumatic pressure, or preferably electric motor control, forces the fluid components into a mixer and then through a dispensing nozzle or opening to the ultimate receptacle or work-piece, such as is described in my earlier U.S. Pat. Nos. 5,816,445; 6,050,450; 6,089,407 and PCT/IB99/02052.

There are special applications, however, where an improved degree of control and monitoring may be required, as in the before-mentioned application to closed or hidden cavities and the like where uniform, constant and complete filling of the cavity is essential but visual inspection is not possible; or where uniform and constant cross-section sealant or other gasket beads or the like are to be laid down, as in grooves or otherwise.

It is to the assuring or guaranteeing of such results, that the present invention is primarily directed, calling for significant improvement in the ability to inject such fluid material into a closed cavity to a defined pressure; and, additionally, to a novel capability to create constant flow rate through fluid coupling or delivery flexible hoses, particularly where the dispensing head is some distance from the fluid pumps or other force-applying mechanisms.

As disclosed in the above-cited exemplary patents, electric motor power is often preferred for controlling the developing of the fluid-dispensing injection forces; and, in accordance with the present invention, the preferred fluid dispensing apparatus is under the control of later-described electrically controlled gear pumps.

SUMMARY

In summary, however, from one of its important aspects, the invention embraces a method of dispensing viscous fluids that when mixed are to fill a cavity, that comprises, injecting the fluids from a source under pressure along a resiliently flexible volume-expandable conduit connected to a common mixing dispenser; dispensing the fluids from the mixing dispenser into the inlet of a cavity-to-be-filled thereby; adjusting the pressure of the fluid injection to a predetermined value normally required completely to fill the cavity; increasing the pressure further above said predetermined value to guarantee such complete cavity filling, with the conduit flexibly expanding to accommodate for the increased pressure; thereupon shutting off the cavity inlet from the conduit; enabling the fluid from the expanded conduit to flow back to the source to relieve pressure if desired; and disconnecting the dispenser from the cavity inlet.

A most commonly used mixing element in metered mix systems is the static mixer, which has the advantage that it mixes material without injecting air. Static mixers, however, present a considerable resistance to flow and this resistance is not linear. Twice the flow rate, for example, will actually produce more than twice the resistance to flow. The higher the viscosity of the fluid material, moreover, the higher the flow resistance. Combinations of high viscosity and speed can even require pressures in excess of 1000 PSI (pounds per square inch).

As above pointed out, the flow rate effect particularly becomes a problem in systems where the dispensing head is remote from the pumps—a configuration that exists in many, if not a majority of dispensing systems. The uneven flow is especially problematic in a typical situation where the user is trying to lay down a constant cross-section bead. An example of this would be a gasket bead application where the dispensing head is attached to an end effector on a XYZ positioning table. In these cases, it is not unusual for the pumps to be connected to the dispensing head by several feet of flexible hose. When dispensing of the bead first starts, the flow rate is slower, and therefore the cross-section of the bead is smaller than specified. This is because the flow resistance of the static mixer causes the hose to expand until the pressure drop across the static mixer equals the pressure inside the hose. During this time, part of the material will go into expanding the hose and a part will go through the static mixer. The resulting cross section of the bead consequently will deleteriously vary until the pressure is in equilibrium.

This problem is solved, in accordance with a feature of the present invention, by a novel combined use with the flexible hose of a pressure sensor, an integral shut-off valve and a novel microprocessor control and software, all as later more fully explained. The user first determines the required pressure to dispense the bead. Previously, when the system first starts up, it feeds material through the static mixer so that the static mixer is full. When the fluid pumps start, the integral shut-off valve is kept closed until the pressure inside the hose reaches the required dispensing pressure. At such time, two events happen simultaneously: (1) a signal is sent to the XYZ table to begin dispensing the bead; and (2) the integral shut-off valve is opened to begin the flow. Since the required pressure was built up before the start of the dispensing, however, when the dispensing starts, all the pumped material flows through the static mixer, providing for a constant flow rate. This constant flow rate now creates the sought-after bead with a constant cross-section.

The second problem of uniform and complete cavity filling is also solved by the combined use of the above-mentioned features, enabling also the ability to fill a closed cavity to a predefined pressure. An example of this is when, as an illustration, only 100 PSI pressure is required to fill a closed cavity and, yet 500 PSI is required to assure that the smallest recess of the cavity has been totally filled. To perform this function, a seal is first established between the outlet of the static mixer and the cavity to be filled. Dispensing is started and continues until the cavity is filled. During this phase, the pressure sensors read 100 PSI. But once the cavity is filled, the material can only go into the flexible hose, expanding it, and the resulting pressure will increase. This pressure will also be transmitted to the cavity, insuring its total filling. Once the 500 PSI pressure is reached, the integral shut-off valve is activated and the dispensing is terminated.

For two-component dispensing, a pair of the before-mentioned gear pumps can be geared together to turn at a fixed ratio as later more fully explained; or they can be driven individually, in which case it becomes a variable ratio system. Driving the pumps individually allows them to pump at different speeds from each other. If, for example, one pump turns twice as fast as the other pump, the dispensing ratio will be 2:1, etc. When dispensing two-part materials, moreover, the volume ratio is programmable, as is the speed of dispensing. Preferably, also as later fully described, all motors operate closed loop, with each having an encoder attached to its shaft. The encoder sends a feedback signal to the microprocessor such that the verification of the gear pumps speed is in real-time.

Preferred embodiments and best mode designs are later presented.

DRAWINGS

The invention will now be described in connection with the accompanying drawings, FIG. 1 of which is a schematic diagram of a cavity-filling dispensing apparatus operating in accordance with the method of the invention;

PREFERRED EMBODIMENT(S) OF THE INVENTION

Figure 1:
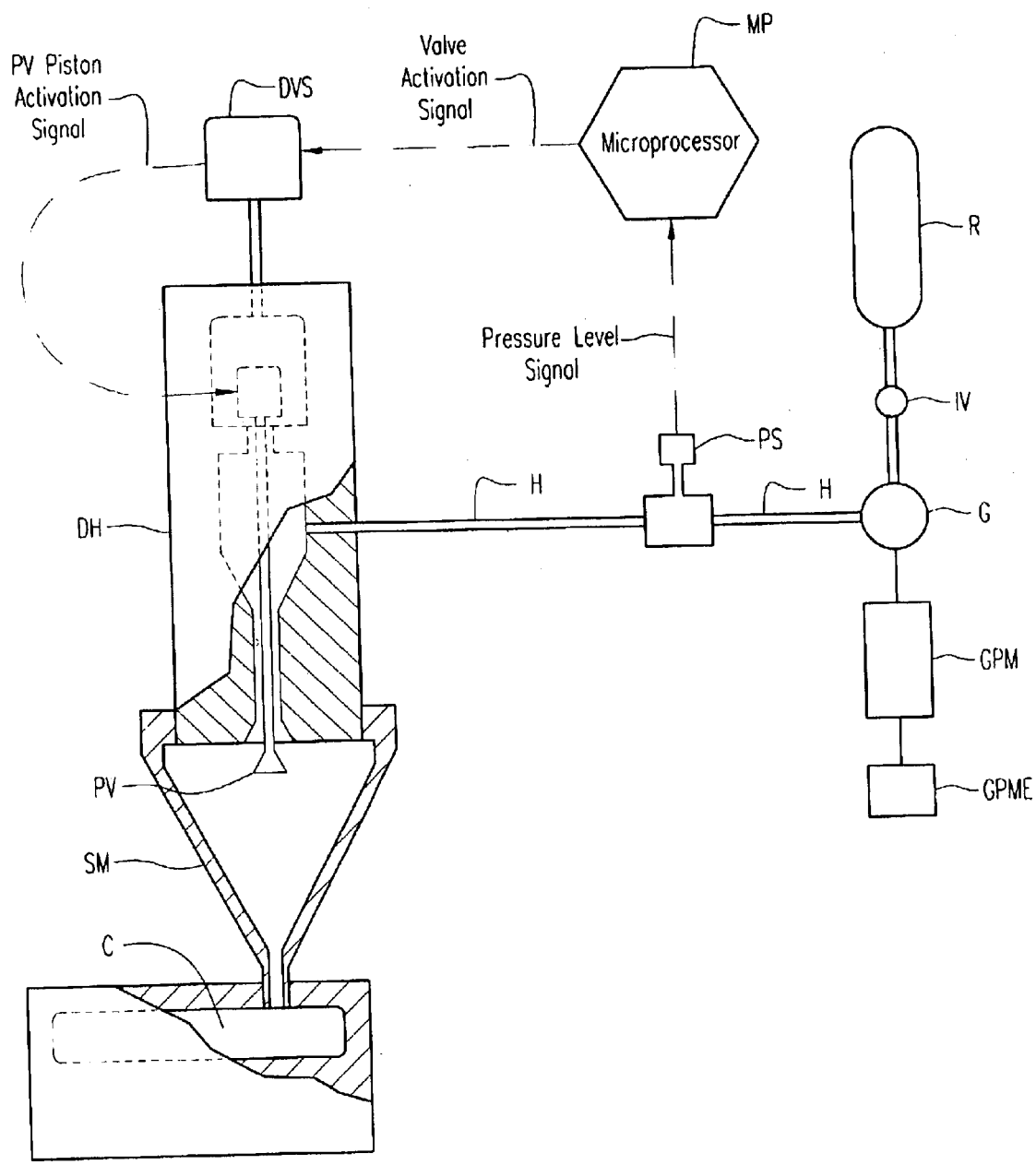

Referring to FIG. 1, in the system schematically diagrammed in FIG. 1, a reservoir R holds the fluid material that is to be injected or dispensed. An input valve IV may be used to maintain the fluid pressure throughout the entire system if desired. When the valve is open, the fluid material can flow from the reservoir R to a fluid pump G, such as the before mentioned gear pump type, turned by an electric motor GPM having a shaft encoder GPME.

A suitable gear pump G may, for example, be of the positive displacement type, such as the Zenith B9000 series (Parker Hannaford Co.).

The encoder GPME verifies the turning of the pump, with the number of turns indicating the amount of fluid material dispensed. At the fluid output of the pump G, a pressure sensor PS is connected, maintaining the pressure of the output fluid flow through a somewhat flexible delivery conduit or hose H. The pressure sensor continuously checks the fluid pressure of the material as it is transferred by the hose H to a dispensing head DH. The dispensing head is shown preferably including a poppet valve PV, that opens and closes in response to signals from the system microprocessor controller MP that activates a dual air valve solenoid DVS for controlling the piston of the poppet valve PV, providing for an instantaneous shut off of material flow at the end of the fluid dispensing. At the beginning of the dispensing cycle, upon starting the energizing of the gear pump motor GPM, the pressure sensor PS immediately begins monitoring the fluid flow output pressure, and at the same time, the dispensing valve PV opens and material proceeds to flow from the reservoir R through the pump G, through the delivery hose or conduit H, through the dispensing head DH and then through a before- mentioned static mixer SM, and finally is injected into a cavity C that is to be filled. The principal fluid material continues to flow until the pressure sensor PS detects a pre-programmed pressure level, for instructing the microprocessor MP to halt further dispensing by closing the poppet valve PV, shutting the cavity off from the delivery conduit H. Suitable static mixers for these purposes are, for example, the ME, MS and MR series of Mix-Pac Company and the 160 series of TAH Company of New Jersey.

In this operation, since the speed of the gear pump P is controlled and known, and thus the rate of fluid dispensing is known, and the encoder indicates the exact amount of material dispensed, and the absolute maximum volume of the cavity C is known, by the end of a specified time, the cavity should be fully filled, and at that particular time the pressure should be rising very rapidly throughout the system because the material then has nowhere else to go except into back-pressure expanding of the flexible hose H. Not only do these provide all the necessary parameters for pressurized filling of the cavity, and guaranteeing such filling, but if such a rapid rise in pressure is not then reached, this provides a system-failure indicator (safe fail) of some breach or place of escape in the system.

Such back pressure is permitted to build up to a predetermined point for guaranteeing that the cavity is fully filled. As an example, if it normally requires 250 PSI to fill the cavity, it may be decided to await the doubling of that pressure before shutting off the dispensing head so as absolutely to guarantee that the cavity is filled throughout every nook and cranny. The shut-off or termination pressure, therefore, may be set for 500 PSI.

The hose flexible conduit or hose H has now been expanded due to the back pressure and, after shut-off, will want resiliently to return to its original size. If the inlet valve IV is open, the material will flow back from the hose through the pump back into the reservoir R. If the inlet valve is closed, however, then the pressure will remain trapped between the output poppet valve PV in the dispensing head DH and the inlet valve IV. In such event, the entire passage from the inlet IV valve through the pump G through the high-pressure hose H to the dispensing head DH will remain pressurized, at least to some degree, so that the next time fluid is to be dispensed, the commencing of such dispensing will occur at a high-pressure, instead of having to build up pressure. In many instances, however, the excess material simply returns to the reservoir and the pressure bleeds off the system, releasing or relieving at least part of the static mixer pressure. In other instances, on the other hand, such as in forming a sealant or other bead the static mixer presents a very high resistance to flow, requiring a build-up of a significant amount of pressure to push the material—and in such and other applications of similar requirements, having a locked in high-pressure starting point may be desirable.

When dispensing beads, indeed, the ability to create a pressurized system and use the conduit or hose as the second reservoir or supplemental source of pressurized material will guarantee a even flow—a very useful result in robotic situations where dispensing from the gear pump can be quite far away from the dispensing head itself. Such pre-pressurizing may also be useful in the filling of cavities on a production or assembly line, since there will be no time lost in building up pressure—the pressure is already there, and the interval between fluid injections can thus be short.

Figure 2:
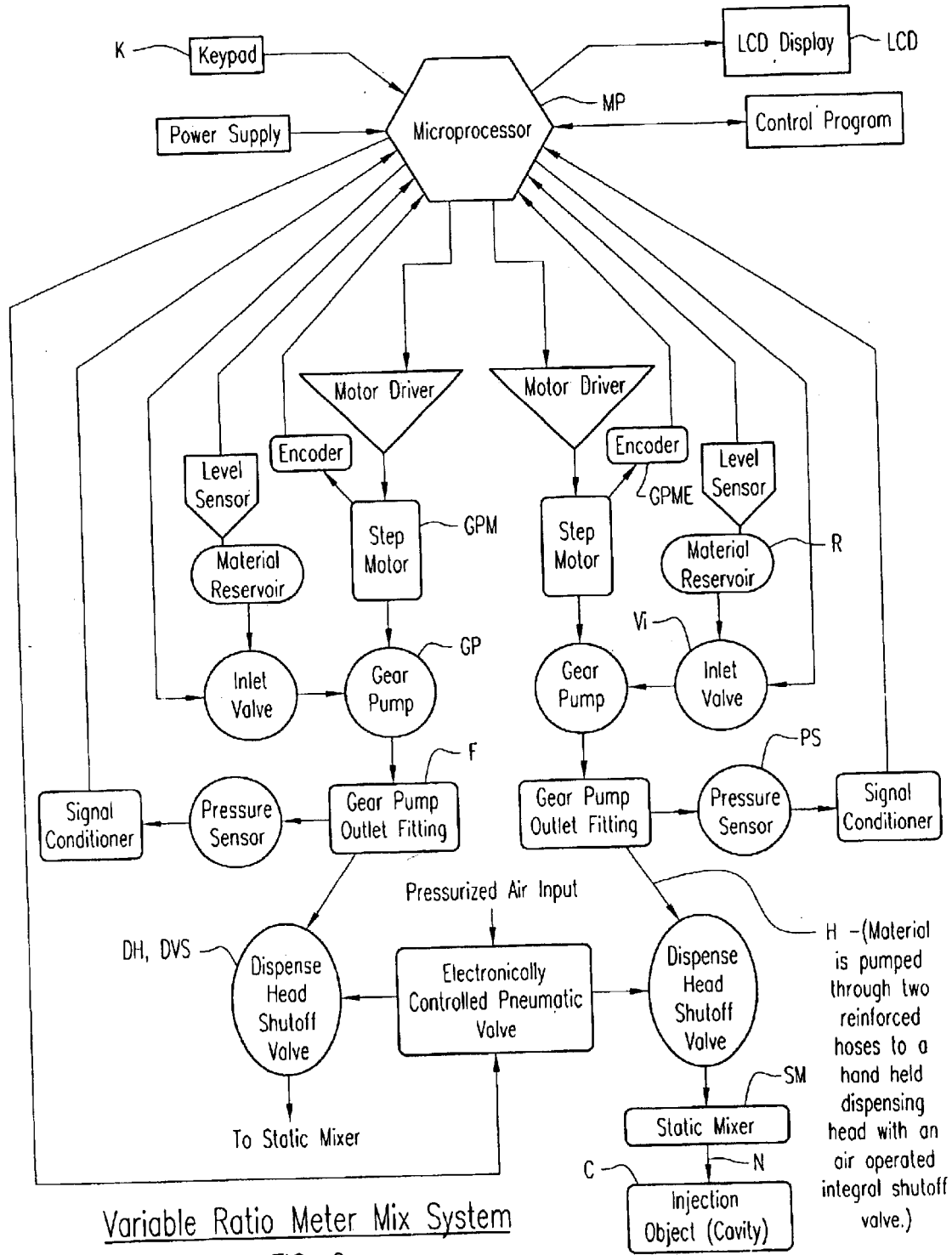
FIG. 2 is a more detailed system diagram shown adaptation for multiple (two) component or duplicate operation, and also with available variable ratio mixing, if desired.

As before mentioned, a pair of systems of the type shown in FIG. 1 is shown in the embodiment of FIG. 2, suitable for either two-component fluid operation or duplicate operation with a single type fluid, and also with closed loop microprocessor feedback controls FB, and with the option of providing variable ratio mixing of two fluid systems, if desired. The two-gear pump motors GPM of FIG. 2, illustrated as of the step motor type, will be simultaneously operated. If turning at the same speed simultaneously, and with both respective pumps GP at the same displacement, then the fluid delivery through each corresponding static mixer SM will be in equal amounts of the same material. When they pass through their static mixers SM, a ratio of 1:1 is obtained. If, however, one pump turns twice as fast as the other, then the pump turning twice as fast will deliver twice the volume, resulting in a mixing ratio of 2:1. Thus there is provided the ability to vary the speed of one motor as opposed to the other and produce virtually an infinite number of ratio variations.

If, as another example, a ratio of 5.26:1 is desired, this is easy to achieve by operating one pump motor 5.26 times faster than the other. For two-component (or more) fluids, similarly, variable ratios may be achieved.

Figure 4:
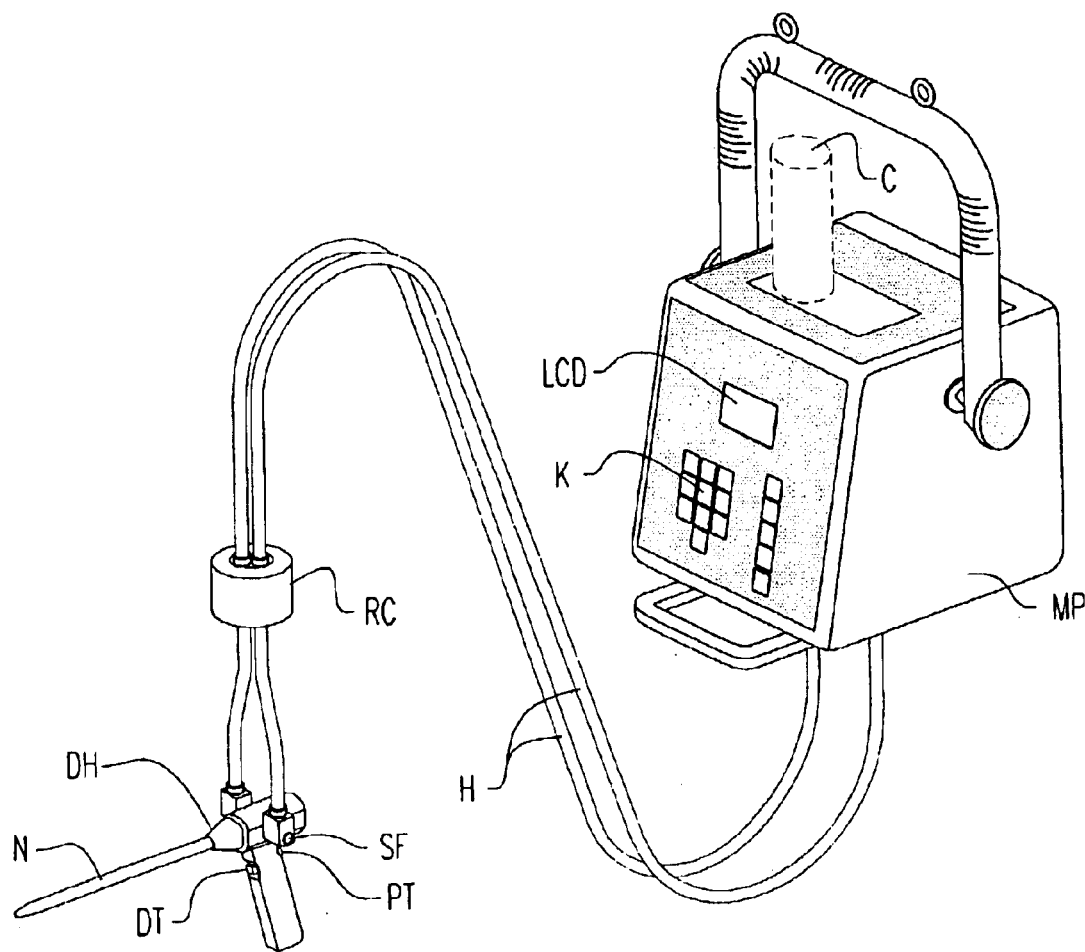
FIG. 4 is an isometric view of a prototype form of the injector apparatus of the invention.

In FIG. 4, a successful prototype apparatus embodying the invention is illustrated, showing a packaged implementation of the system of FIG. 2, adapted to be mounted suspended from the upper handle or to be stand-mounted, as in a rollaround stand (not shown), if desired. Dispense and purge trigger buttons DT and PT, respectively, and the hand-held gun and nozzle N configuration, are similar to those detailed in my earlier above-referenced patents. A rotary coupling RC at the end of the flexible high-pressure conduit or hose H (hose length not to scale) permits rotation to the horizontal plane, and 90° swivel fittings SF permit rotation in the vertical plane. The combination of the rotary coupling and swivel fittings gives the operator complete freedom of movement with the dispensing head.

Figure 5:
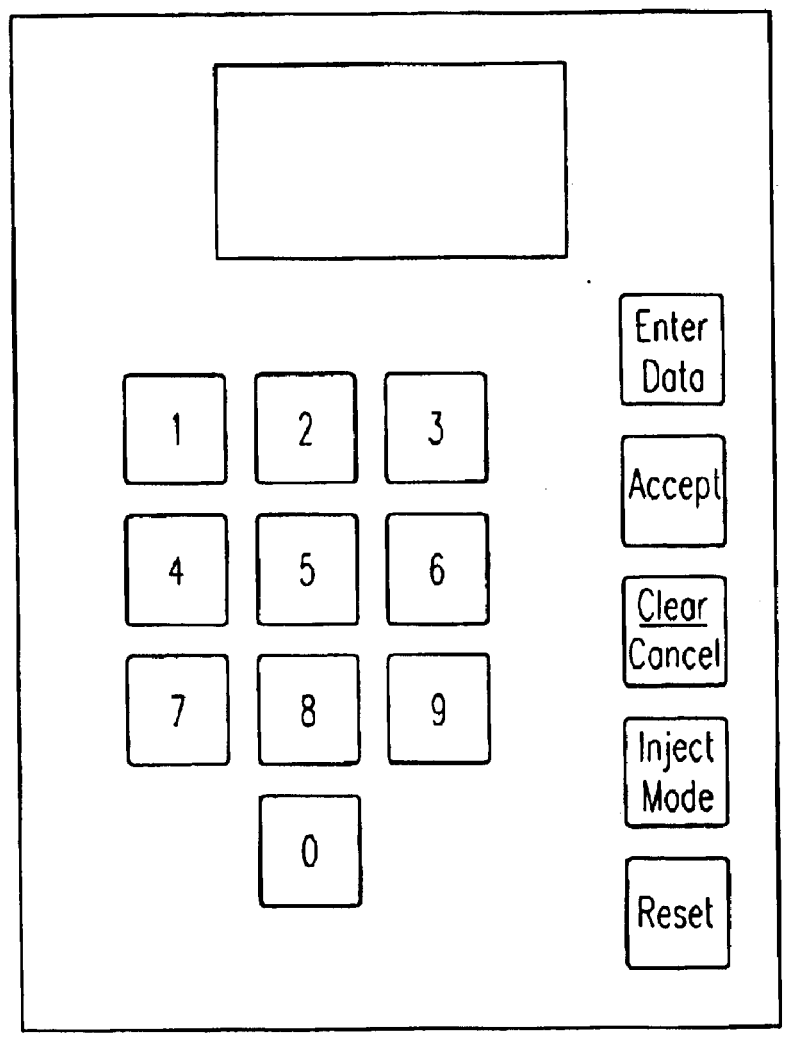
FIG. 5 is an enlarged view of the control keypad of FIGS. 2 and 4.

The microprocessor MP within the housing is programmed by the easy-to-use keypad K and the LCD interface. As more clearly shown in FIG. 5, the keypad includes ten numeric keys and five function keys "ENTER DATA", "ACCEPT", "CLEAR/CANCEL", "INJECT MODE" and "RESET".

With the "ENTER DATA" key, the operator may enter five values in the data entry mode as follows:
1. Min volume
   This is the minimum possible volume of the LIS (liquid injection sealant) groove to be injected, per acceptable manufacturing tolerances.
2. Max volume
   This is the maximum possible volume of the LIS groove to be injected per acceptable manufacturing tolerances.
3. Speed
   This is the injection speed in cc/minute for the part. The optimum speed depends upon the volume and length of the LIS groove to be filled.
4. Shutoff pressure
   This is the pressure observed when the LIS groove is completely filled. This value depends on the length and volume of the LIS groove. Dispensing will be halted when this pressure is reached.
5. Check value
   This value is a function of the first four values entered and is used to verify correct data entry.

The ACCEPT key is used to complete the entry of each value entered. When pressed following input of the check value, above, the system exits the data entry mode, provided that the check value matches the expected value associated with the four data values entered previously. Otherwise, audible and visual error warnings are activated.

The CLEAR/CANCEL key is used to clear in correct data or cancel the selection of inject mode before dispensing begins. Once injection starts, pressing the key has no effect.

The INJECT MODE key is used to enable injection once correct data has been entered. To start the injection, the operator depresses and releases the dispense trigger DT on the dispenser head DH.

The RESET key is used to reset any error condition.

Figure 3:
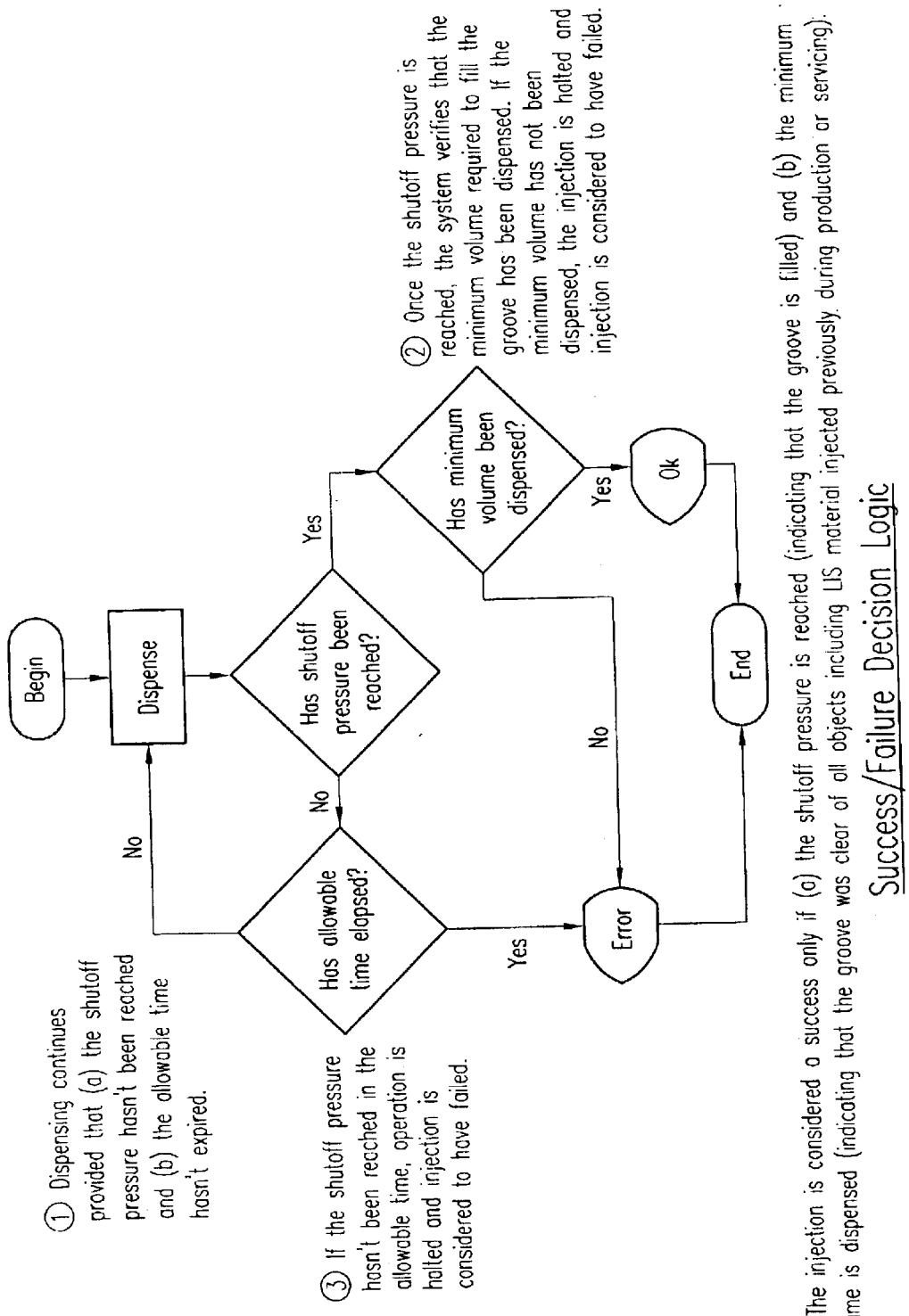
FIG. 3 is a decision logic flow diagram for the application to groove or cavity filling.

Successful and guaranteed filling is thus promoted by (1) the sensing that verifies sufficient material and pressure to complete the injection before beginning it, (2) the verifying that the operator has entered the correct data for the use of the check value entry, and (3) the encoding that provides a closed-loop feedback system FB, FIG. 2, that confirms that the volume to be dispensed has, in fact, been dispensed. The success/failure decision logic flow chart is shown in FIG. 3.

An example illustrating this decision logic operation is now presented.

The operator will be told—e.g., via a service manual—the five values to enter in the system (min. volume, max. volume, speed, shut off pressure, and check value) to inject material into a given part. These values will have been determined previously at the factory through experimentation. For example, assume the following for a given part:

The groove or cavity to be filled has a nominal volume of 19 cc. Due, however, to acceptable variations in manufacturing, the groove volume can be as little as 16 cc (min. volume) or as much as 22 cc (max. volume).

The optimum injection rate to use for this part is 120 cc/min.

When filling this part with 22 cc of material at 120 cc/min., the pressure sensed or observed during representative trials never exceeded 800 PSI.

The hoses H that carry material from the base system to the dispensing head DH expand to hold an additional 1 cc of material for each 100 PSI of pressure.

From these observations, it follows that the system should be programmed to dispense 30 cc of material (22 cc filling the maximum acceptable volume of the groove plus 8 cc for additional material left in the hose due to expansion). The time to inject this part, moreover, should, be 15 seconds (the time it takes to dispense 30 cc at a rate of 120 cc/minute).

This data is now sufficient for the system to determine the success or failure of injection according to the logic flow of FIG. 3.

While illustrated for use with pre-filled cartridges attached at the top in a cartridge cap C, FIG. 4, the methodology of the invention is equally useful for bulk material supply, and for single materials (one-half the system of FIG. 2, for example, or FIG. 1); and certain aspects are also useful with other types of pumping or fluid-force driving mechanisms than the preferred gear pumps, and also for non-electric pneumatic or hydraulic or related drive systems, as well; further modifications being also readily apparent to those skilled in this art, and being considered to fall within the spirit and scope of the invention as defined in the appended claims.

What is claimed is:

1. A method of dispensing viscous fluids that when mixed are to fill a cavity, that comprises, injecting the fluids from a source under pressure along a resiliently flexible volume-expandable conduit connected to a mixing dispenser; dispensing the fluids from the mixing dispenser into the inlet of a cavity-to-be-filled thereby; adjusting the pressure of the fluid injection to a predetermined value normally required completely to fill the cavity; increasing the pressure further above said predetermined value to guarantee such complete cavity filling, with the conduit flexibly expanding to accommodate for the increased pressure; thereupon shutting off the cavity inlet from the conduit; enabling the fluid from the expanded conduit to flow back to the source to relieve pressure if desired; and disconnecting the dispenser from the cavity inlet.

2. The method of claim 1 wherein the pressure is sensed during the filling to serve also as a system-failure indicator as where the sensed pressure increase is not sensed.

3. The method of claim 1 wherein the pressure is produced by pumping the fluid.

4. The method of claim 1 wherein the viscous fluids comprise two-component fluids that, after mixing and dispensing, cure within in the cavity.

5. The method of claim 1 wherein constant fluid flow rate is maintained through the conduit throughout the filling.

6. The method of claim 3 wherein the pumping dispensing is effected by electrical motor driving of fluid-displacement gear pumps.

7. The method of claim 6 wherein the pressure sensing applies electrical feedback signals to control the fluid dispensing.

8. The method of claim 7 wherein the fluid dispensing in response to said feedback signals is microprocessor controlled.

9. The method of claim 8 wherein the fluid dispensing volume is monitored by encoding the electrical motor rotations driving the fluid-displacement gear pumps, and feeding corresponding encoding signals to the microprocessor control.

10. The method of claim 9 wherein the microprocessor is controlled by software programmed with entries representing minimum and maximum possible volumes of fluid dispensing for filling, the fluid injecting speed, said increased further pressure above said predetermined valve for shut-off, and verification of correct data for said entries.

11. The method of claim 10 wherein error warnings are activated in the event said entries are not verified.

12. The method of claim 10 wherein, upon such verification, thereupon enabling said fluid dispensing into the cavity inlet.

13. A method of dispensing viscous fluid sealant beads of uniform cross-section, that comprises, injecting the fluid(s) from a source under pressure along a resiliently flexible volume-expandable conduit connected to a mixing dispenser; dispensing the fluid from the mixing dispenser into the region to be filled with the bead; adjusting the pressure of the fluid to a predetermined value normally required to fill said region with said bead; increasing the pressure further above said predetermined value to guarantee a constant fluid flow rate during the filling and a resulting uniform cross-section of bead, with the conduit flexibility expanding to accommodate for the increased pressure; and thereupon shutting off the dispensing and disconnecting the dispenser from said region.

14. The method of claim 13 wherein the viscous fluid comprises two-component fluids that, after mixing and dispensing, cure into the bead.

15. The method of claim 14 wherein the pressurized dispensing is effected by electrical motor driving of fluid-displacement gear pumps.

16. The method of claim 15 wherein the pressure is sensed during the fluid dispensing and such sensing applies electrical feedback signals to control the fluid dispensing.

17. The method of claim 16 wherein the fluid dispensing in response to said feedback signals is microprocessor controlled.

18. The method of claim 17 wherein the fluid dispensing volume is monitored by encoding the electrical motor rotations driving the fluid-displacement gear pumps, and feeding corresponding encoding signals to the microprocessor control.

19. The method of claim 18 wherein the microprocessor is controlled by software programmed with entries representing minimum and maximum possible volumes of fluid dispensing for filling, the fluid injecting speed, said increased further pressure above said predetermined valve for shut-off, and verification of correct data for said entries.

20. The method of claim 19 wherein error warnings are activated in the event said entries are not verified.

21. The method of claim 15 wherein the ratio of the mixing of the two fluid components is varied by varying the relative speed of motor drive of respective gears within said fluid-displacement gear pumps.

22. The method of claim 6 wherein the ratio of the mixing of the two fluid components is varied by varying the relative speed of motor drive of respective gears within said fluid-displacement gear pumps.

23. A dispenser of viscous fluids for uniformly filling a cavity, and/or producing a sealant bead of uniform cross-section, having, in combination, a pump for injecting the fluids from a source under pressure along a resiliently flexible volume-expandable conduit connected to a mixing dispenser; a nozzle for dispensing the fluids from the mixing dispenser into the inlet of a cavity-to-be-filled and/or a region-to-be-scaled thereby; means for adjusting the pressure of the fluid injection to a predetermined value normally required completely to fill the cavity and/or to lay down the sealant bead and for increasing the pressure further above said predetermined value to guarantee such complete cavity filling and/or bead production, with the conduit flexibly expanding to accommodate for the increased pressure; thereupon shutting off the cavity inlet and/or sealant region from the conduit; enabling the fluid from the expanded conduit to flow back to the source to relieve pressure if desired; and means for disconnecting the dispenser from the cavity inlet and/or sealant region.

24. The dispenser of claim 23 wherein a pressure sensor is provided for sensing fluid flow pressure during the filling to serve also as a system-failure indicator as where the sensed pressure increase is not sensed.

25. The dispenser of claim 23 wherein the viscous fluids comprise two-component fluids that, after mixing and dispensing, cures within the cavity and/or sealant region.

26. The dispenser of claim 25 wherein the fluids are of the LIS type.

27. The dispenser of claim 23 wherein means is provided for maintaining a constant fluid flow rate through the conduit throughout the filling.

28. The dispenser of claim 23 wherein the pumping dispensing is effected by electrical motor driving of fluid-displacement gear pumps.

29. The dispenser of claim 27 wherein the pressure sensor applies electrical feedback signals to control the fluid dispensing.

30. The dispenser of claim 29 wherein the fluid dispensing in response to said feedback signals is microprocessor controlled.

31. The dispenser of claim 30 wherein the fluid dispensing volume is monitored by an encoder encoding the electrical motor rotations driving the fluid-displacement gear pumps, and a path is provided for feeding corresponding encoding signals to the microprocessor control.

32. The dispenser of claim 31 wherein the microprocessor is controlled by software programmed with entries representing minimum and maximum possible volumes of fluid dispensing for filling, the fluid injecting speed, said increased further pressure above said predetermined valve for shut-off, and verification of correct data for said entries.

33. The dispenser of claim 32 wherein means is provided for activating error warnings in the event said entries are not verified.

34. The dispenser of claim 33 wherein means is provided, operable upon such verification, for thereupon enabling said fluid dispensing into the cavity inlet and/or, bead sealant region.

35. The dispenser of claim 23 wherein the same is operated simultaneously with a second similar dispenser having a corresponding conduit and mixing dispenser.

36. The dispenser of claim 25 wherein the pumping dispensing is effected by electrical motor driving of fluid-displacement gear pumps.

37. The dispenser of claim 36 wherein means is provided for varying the ratio of the mixing of the two fluid components by varying the relative speed of motor drive of respective gears within said fluid-displacement gear pumps.

38. The dispenser of claim 23 wherein means is provided to maintain the conduit expanded after said shutting off of the cavity to enable the expanded conduit to serve as a supplemental pressurized source of fluid for a subsequent dispensing.

39. The dispenser of claim 38 wherein the viscous fluids are selected from the group consisting of highly viscous epoxies, urethanes, silicones, and plastic adhesives.

40. The method of claim 1 wherein the conduit is maintained expanded after said shutting off of the cavity to enable the expanded conduit to serve as a supplemental pressurized source of fluid for a subsequent dispensing.

41. The method of claim 13 wherein the conduit is maintained expanded after said shutting off of the cavity to enable the expanded conduit to serve as a supplemental pressurized source of fluid for a subsequent dispensing.

* * * * *